(12) United States Patent
Arad (10) Patent No.: US 7,830,873 B1
(45) Date of Patent: Nov. 9, 2010

(54) IMPLEMENTATION OF DISTRIBUTED TRAFFIC RATE LIMITERS

(75) Inventor: Carmi Arad, Nofit (IL)

(73) Assignee: Marvell Israel (M.I.S.L.) Ltd. (IL)

( * ) Notice: Subject to any disclaimer, the term of this patent is extended or adjusted under 35 U.S.C. 154(b) by 718 days.

(21) Appl. No.: 11/651,723

(22) Filed: Jan. 9, 2007

(51) Int. Cl.
*H04L 12/56* (2006.01)
(52) U.S. Cl. .................. 370/389; 370/216; 370/392; 370/412
(58) Field of Classification Search ............ 370/401, 370/389; 707/201, 200, 3; 711/219
See application file for complete search history.

(56) References Cited

U.S. PATENT DOCUMENTS

| | | | | |
|---|---|---|---|---|
| 5,551,027 A | * | 8/1996 | Choy et al. ............ | 707/201 |
| 5,852,607 A | * | 12/1998 | Chin .................... | 370/401 |
| 5,963,960 A | * | 10/1999 | Swart et al. ............ | 707/202 |
| 6,101,591 A | * | 8/2000 | Foster et al. ............ | 711/219 |
| 6,192,051 B1 | * | 2/2001 | Lipman et al. .......... | 370/389 |
| 6,430,188 B1 | * | 8/2002 | Kadambi et al. ........ | 370/398 |
| 6,438,562 B1 | * | 8/2002 | Gupta et al. ........... | 707/201 |
| 6,456,296 B1 | * | 9/2002 | Cataudella et al. ...... | 345/619 |
| 6,772,348 B1 | * | 8/2004 | Ye ..................... | 726/13 |
| 6,798,746 B1 | * | 9/2004 | Kloth et al. ............ | 370/235 |
| 6,823,446 B1 | * | 11/2004 | Sinharoy ............... | 712/239 |
| 6,868,414 B2 | * | 3/2005 | Khanna et al. .......... | 707/3 |
| 6,888,838 B1 | * | 5/2005 | Ji et al. ................ | 370/401 |
| 6,895,498 B2 | * | 5/2005 | McDonald et al. ...... | 712/238 |
| 6,950,652 B2 | * | 9/2005 | Janssen et al. .......... | 455/419 |
| 6,965,674 B2 | * | 11/2005 | Whelan et al. .......... | 380/270 |
| 6,996,117 B2 | * | 2/2006 | Lee et al. .............. | 370/429 |
| 7,003,639 B2 | * | 2/2006 | Tsern et al. ............ | 711/154 |
| 7,019,674 B2 | * | 3/2006 | Cadambi et al. ........ | 341/106 |
| 7,042,884 B2 | * | 5/2006 | Huang et al. .......... | 370/395.54 |
| 7,080,151 B1 | * | 7/2006 | Borella et al. .......... | 709/230 |
| 7,130,867 B2 | * | 10/2006 | Luke .................. | 707/200 |
| 7,200,144 B2 | * | 4/2007 | Terrell et al. .......... | 370/389 |
| 7,263,099 B1 | * | 8/2007 | Woo et al. ............. | 370/390 |
| 7,274,698 B2 | * | 9/2007 | Shankar et al. ......... | 370/392 |
| 7,304,996 B1 | * | 12/2007 | Swenson et al. ........ | 370/394 |
| 7,446,681 B2 | * | 11/2008 | Gunther ............... | 341/106 |
| 7,584,262 B1 | * | 9/2009 | Wang et al. ........... | 709/217 |
| 2002/0044014 A1 | * | 4/2002 | Wright et al. .......... | 330/2 |
| 2004/0085956 A1 | * | 5/2004 | Moriarty et al. ........ | 370/389 |
| 2005/0058131 A1 | * | 3/2005 | Samuels et al. ........ | 370/389 |
| 2005/0131677 A1 | * | 6/2005 | Assadollahi ........... | 704/201 |
| 2006/0114912 A1 | * | 6/2006 | Kwan et al. ........... | 370/395.4 |
| 2006/0236221 A1 | * | 10/2006 | McCausland et al. .... | 715/500.1 |
| 2006/0294300 A1 | * | 12/2006 | Lubbers ............... | 711/113 |
| 2007/0280258 A1 | * | 12/2007 | Rajagopalan et al. .... | 370/395.3 |

* cited by examiner

*Primary Examiner*—Thong H Vu (57) ABSTRACT

A method of processing packets and a network device are disclosed. Packets are received from separate ingress processing pipelines during a processing cycle. Control information for each packet is retrieved from one or more databases serving each pipeline and used to perform operations representative of different processing outcomes. Results of the operations are selected and used to update the databases, in some cases, based upon whether a relationship is detected between the packets.

36 Claims, 6 Drawing Sheets

IMPLEMENTATION OF DISTRIBUTED TRAFFIC RATE LIMITERS

BACKGROUND OF THE INVENTION

The present invention relates to network communications in general and, more specifically, to devices that manage traffic on data networks.

New telecom standards and widespread use of high-density computing platforms have produced demand for network devices that can process traffic from an increasing number of sources at increasingly higher data rates.

The throughput of a network device may be expressed in terms of the number and type of its ports and is usually related to several factors. Among the various factors, the throughput of a network device may be closely related to its core operating frequency.

Practical considerations limit the ability to increase throughput by raising the core operating frequency. For example, high-speed chips may be expensive to manufacture and may require high-bandwidth memory, substantially increasing to the cost of the network device.

One approach to increasing the throughput of a network device while maintaining lower core operating frequencies is to distribute processing tasks among multiple processing units. However, this approach presents many challenges, particularly with respect to ingress policing and other rate limit processing operations. The present invention addresses these challenges.

BRIEF SUMMARY OF THE INVENTION

According to one embodiment of the present invention, a method of processing packets is disclosed. The method includes receiving first and second packets having first and second index values respectively. The method also includes looking up first and second entries using the first and second index values and performing first and second operations. If a predetermined relationship is detected between the first and second index values, the first and second entries are updated identically, otherwise the first and second entries are updated separately. The predetermined relationship may be detected if both packets are subject to the same rate limit as may be the case if the first index value equals the second index value.

In some embodiments, the first and second entries contain rate limit parameters. The first operation may comprise updating a separate number of tokens corresponding to a rate limit for each of the first and second entries, and the second operation may comprise updating a combined number of tokens for the first and second entries. The first and second packets may be received from first and second ingress pipelines respectively and may be synchronized to a same clock cycle before processing begins.

In additional embodiments, the first packet comprises a first attribute and the second packet comprises a second attribute. The method includes maintaining a first table of control information having N entries in which each entry is associated with a different one of N index values. The method additionally includes maintaining a second table of control information having N entries in which each entry is associated with a different one of the N index values. A first entry corresponding to the first index is retrieved from the first table, and a second entry corresponding to the second index is retrieved from the second table. The first operation is performed using the first entry and the first attribute to generate a first result. The second operation is performed using the second entry and the second attribute to generate a second result. A third operation is also performed using both the first and second entries and the first and second attributes to generate a third result.

If the predetermined relationship is detected between the first and second index values, the first and second entries are updated according to a value defined by the third result. If the predetermined relationship is not detected between the first and second index values, the first entry is updated according to a value defined by the first result and the second entry is updated according to a value defined by the second result. In addition, if the predetermined relationship is not detected, an entry in the first table corresponding to the second index value is updated according to the value defined by the second result and an entry in the second table corresponding to the first index value is updated according to the value defined by the first result.

The first attribute may include a first packet size and a first color value and the second attribute may include a second packet size and a second color value. Also, the first entry may include a first fill rate, a first bucket value, a first burst-size and a first time stamp and the second entry may include a second fill rate, a second bucket value, a second burst-size and a second time stamp. The method may also include adjusting the first bucket value by a first number of tokens if the predetermined relationship is not detected, adjusting the second bucket value by a second number of tokens if the predetermined relationship is not detected, adjusting the first and second bucket values by a third number of tokens if the predetermined relationship is detected, and adjusting the first time stamp and the second time stamp based upon a time reference. In some embodiments, each entry in the tables of control information may include two fill rates, two corresponding buckets values, and a single time stamp. Also, the first packet and the second packet may be synchronized to a same edge of a same clock cycle before processing begins.

According to another embodiment of the present invention, a network device adapted to process data packets is disclosed. The network device includes first and second ingress pipelines configured to receive first and second packets having first and second index values respectively. The network device also includes first and second memories comprising first and second tables. A control block configured to look up first and second entries in the first and second tables using the first and second index values is also included. The control block may be further configured to perform first and second operations using the first and second entries from the tables, to update both tables identically if a predetermined relationship is detected between the first and second index values, otherwise to update the tables separately. The entries may contain rate limit parameters, and the predetermined relationship may be detected if both packets are subject to a same rate limit. The first and second packets may be synchronized to a same clock before processing begins.

In some embodiments, the first operation includes calculating a separate number of tokens corresponding to a rate limit for each of the first and second entries, and the second operation includes calculating a combined number of tokens for the first and second entries. In various embodiments, the first packet includes a first attribute and the second packet includes a second attribute. The first table may have N entries where each entry corresponds to a different one of N index values and the second table may have N entries also corresponding to different ones of the N index values. The control block may be configured to perform the first operation using the first attribute and the first entry to generate a first result, and to perform the second operation using the second attribute and the second entry to generate a second result.

Also, the control block may be configured to perform a third operation using the first and second attributes and the first and second entries to generate a third result and to then update the first and second entries according to a value defined by the third result if a predetermined relationship between the first index value and the second index value is detected.

In additional embodiments, the control block may be configured to update the first entry according to a value defined by the first result if the predetermined relationship is not detected, to update the second entry according to a value defined by the second result if the predetermined relationship is not detected, to update an entry in the first table corresponding to the second index value according to the value defined by the second result if the predetermined relationship is not detected, and to update an entry in the second table corresponding to the first index value according to the value defined by the first result if the predetermined relationship is not detected. The first packet attribute may include a first packet size and a first color value and the second packet attribute may include a second packet size and a second color value. Additionally, the first entry may include a first fill rate, a first bucket value, a first burst-size and a first time stamp and the second entry may include a second fill rate, a second bucket value, a second burst-size and a second time stamp. In some embodiments, each entry includes two fill rates, two corresponding bucket values and a single time stamp. The predetermined relationship may be detected if the first index value equals the second index value.

Inc another embodiment, the control block is configured to adjust the first bucket value by a first number of tokens and the second bucket value by a second number of tokens if the predetermined relationship is not detected, to adjust the first and second bucket values by a third number of tokens if the predetermined relationship is detected, and to adjust the first time stamp and the second time stamp according to a time reference. In specific embodiments, the first packet and the second packets are received by the control block from the first and second ingress pipelines and the control block synchronizes the packets to the same clock cycle before processing begins.

According to another embodiment of the present invention, the network device includes means for receiving first and second packets having first and second index values respectively. The network device also includes means for looking up first and second entries using the first and second index values and performing first and second operations. Means for updating the first and second entries identically if a predetermined relationship is detected between the first and second index values and otherwise updating the first and second entries separately are also provided. The predetermined relationship may be detected if both packets are subject to the same rate limit as may be the case if the first index value equals the second index value.

In some embodiments, the first and second entries contain rate limit parameters, the first operation comprises updating a separate number of tokens corresponding to a rate limit for each of the first and second entries, and the second operation comprises updating a combined number of tokens for the first and second entries. The first and second packets may be received from first and second ingress pipelines respectively and may be synchronized to a same clock cycle before processing begins.

In additional embodiments, the first packet comprises a first attribute and the second packet comprises a second attribute. The network device also includes means for maintaining a first table of control information having N entries in which each entry is associated with a different one of N index values. The network device additionally includes means for maintaining a second table of control information having N entries in which each entry is associated with a different one of the N index values. Means for retrieving a first entry corresponding to the first index from the first table, and a second entry corresponding to the second index from the second table are provided. The network device also includes means for performing the first operation using the first entry and the first attribute to generate a first result and means for performing the second operation using the second entry and the second attribute to generate a second result. Additionally, means for performing a third operation using both the first and second entries and the first and second attributes to generate a third result are provided. The network device also includes means for updating the first and second entries according to a value defined by the third result if the predetermined relationship is detected between the first and second index values.

In some embodiments, the network device includes means for updating the first and second entries according to a value defined by the third result if the predetermined relationship is detected between the first and second index values. Additionally, the network device includes means for updating the first entry according to a value defined by the first result and updating the second entry according to a value defined by the second result if the predetermined relationship is not detected between the first and second index values. The network device further includes means for updating an entry in the first table corresponding to the second index value according to the value defined by the second result and updating an entry in the second table corresponding to the first index value according to the value defined by the first result if the predetermined relationship is not detected.

The first attribute may include a first packet size and a first color value and the second attribute may include a second packet size and a second color value. Also, the first entry may include a first fill rate, a first bucket value, a first burst-size and a first time stamp and the second entry may include a second fill rate, a second bucket value, a second burst-size and a second time stamp. The network device may also include means for adjusting the first bucket value by a first number of tokens if the predetermined relationship is not detected, adjusting the second bucket value by a second number of tokens if the predetermined relationship is not detected, adjusting the first and second bucket values by a third number of tokens if the predetermined relationship is detected, and adjusting the first time stamp and the second time stamp based upon a time reference. In some embodiments, each entry in the tables of control information may include two fill rates, two corresponding buckets values, and a single time stamp. The predetermined relationship may be detected if the first index value equals the second index value. Also, means for synchronizing the first packet and the second packet to a same edge of a same clock cycle before processing begins may be provided.

The present disclosure is made with reference to the appended figures. In the figures, similar components and/or features may have the same reference label. Further, various components of the same type may be distinguished by following the reference label with a dash and a second label that distinguishes among the similar components. If only the first reference label is used, the description is applicable to any one of the similar components having the same first reference label irrespective of the second reference label.

DETAILED DESCRIPTION OF THE INVENTION

A method of processing packets and a network device are disclosed. Packets are received from separate ingress processing pipelines during a processing cycle. Control information for each packet is retrieved from one or more databases serving each pipeline and used to perform operations representative of different processing outcomes. Results of the operations are selected and used to update the databases, in some cases, based upon whether a relationship is detected between the packets.

Figure 1:
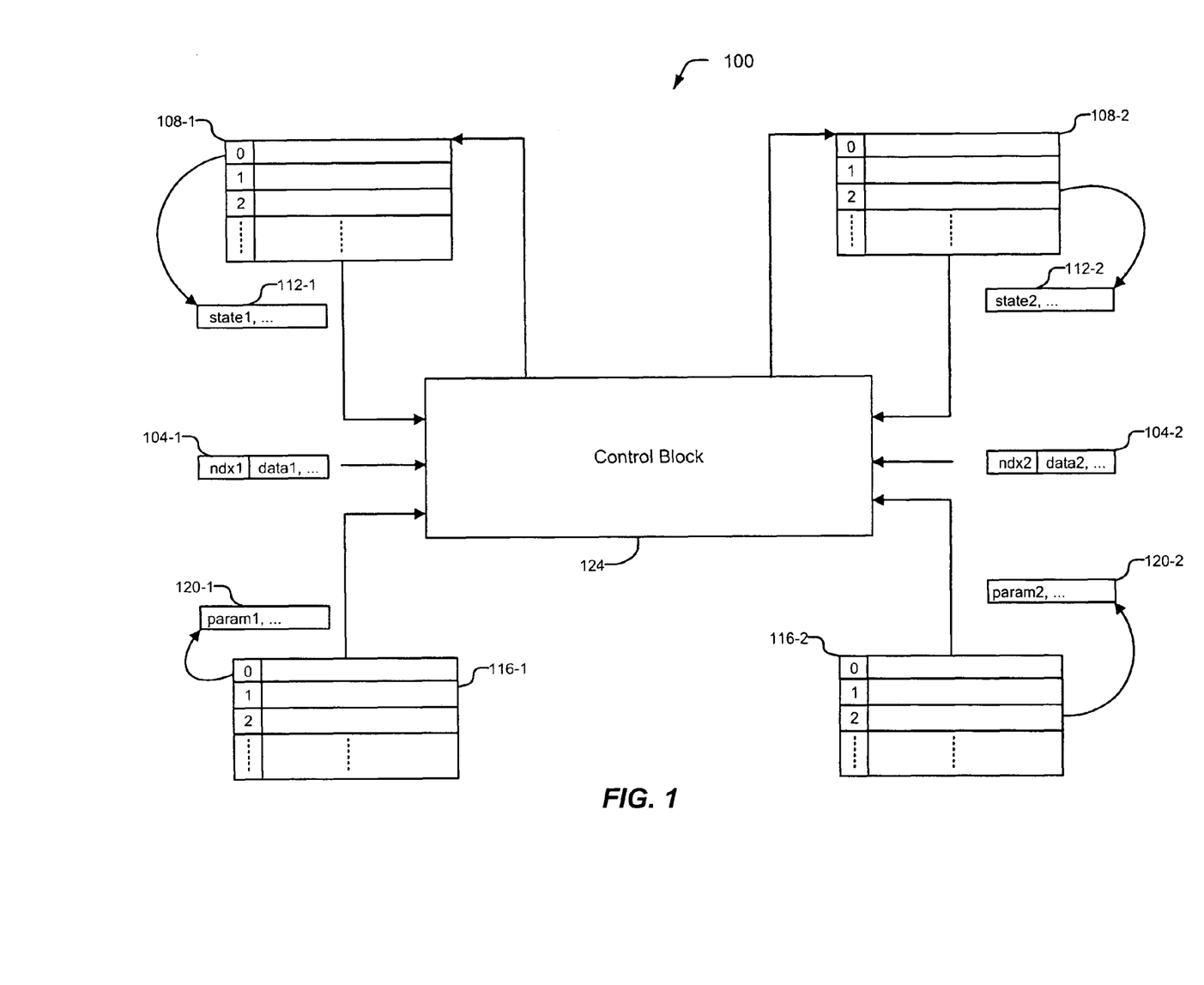
FIG. 1 shows a number of blocks disposed in a network device according to one embodiment of the present invention.

FIG. 1 shows a number of blocks disposed in a network device 100 according to one embodiment of the present invention. As shown, network device 100 is configured to receive and process two packets 104 per processing cycle and includes multiple memory elements 108, 116 for storing control information. It will be recognized that the embodiment shown is for purposes of illustration and that many variations are possible within the scope of the present invention. For example, a network device according to the present invention may process more than two packets per processing cycle and may include different memory configurations.

A processing cycle begins when packets 104 are received by control block 124. In various embodiments, network device 100 includes multiple pipelines for processing network traffic and, during a processing cycle, control block 124 may receive a packet from each processing pipeline. Thus, for example, a first packet 104-1 may be received from a first processing pipeline and a second packet 104-2 may be received from a second processing pipeline. In a specific embodiment, control block 124 includes logic, such as a counter or similar mechanism, for synchronizing the packets 104 to the same edge of a clock at the start of each processing cycle.

As shown, packets 104 include, at least, an index value and a data element. For example, first packet 104-1 includes a first index (ndx1) and a first data element (data1). Similarly, second packet 104-2 includes a second index (ndx2) and a second data element (data2). In some embodiments, the index values correspond to control information used to process the packets.

Control information may be divided into configuration data and state data. For example, configuration data may reflect device settings or other parameters that change infrequently during operation of network device 100. State data, on the other hand, may include values that change during each processing cycle.

Configuration and state data may be stored in separate memories. Thus, in the embodiment shown, network device 100 includes a first state memory 108-1 and a first configuration memory 116-1. These memories, for example, may store control information for processing packets received from a first ingress pipeline (not shown). As shown, network device 100 also includes a second state memory 108-2 and a second configuration memory 116-2 which may store control information for processing packets received from a second ingress pipeline (not shown). In an exemplary embodiment, state memories 108 are dual-port devices that are written to during each clock cycle and read from during each two clock cycles. Configuration memories 116, on the other hand, may be single-port devices.

State data may be stored in memory as a tabular or other data structure and may include a plurality of state data elements 112. As shown, a first state data element 112-1 includes a first state value (state1). Similarly, a second state data element 112-2 includes a second state value (state2). Configuration data may also be stored as a plurality of elements in a tabular or other data structure. Thus, first configuration data element 120-1 may include a first configuration parameter (param1) and second configuration data element 120-2 may include a second configuration parameter (param2).

Control block 124 may be configured to retrieve control information for each packet received during a processing cycle. In some embodiments, index values (ndx1, ndx2) correspond to locations in state and configuration memories 108, 116. Thus, control block 124 may use the index values to retrieve control information from memory. For example, during the processing cycle, first packet 104-1 may be received from a first ingress pipeline. Control block 124 may use ndx1 to retrieve state data element 112-1 from state memory 108-1. Control block 124 may also use ndx1 to retrieve configuration data element 120-1 from first configuration memory 116-1. This process may be repeated for second packet 104-2 to retrieve state data element 112-2 and configuration data element 120-2 from second state and configuration memories respectively. Although described in sequential fashion, it will be noted that control block 124 may retrieve state and configuration data concurrently for each packet received during the processing cycle.

Using packet information and control information, control block 124 may perform several processing operations. In some embodiments, each processing operation corresponds to a particular relationship between the packets 104 being processed. For convenience, these operations may be represented as functions $f_1$, $f_2$, $ff_3$ of packet information (data1, data2) and control information (param1, state1, param2, state2) as in the following expressions:

$clc1 = f_1(data1, state1, param1, \ldots)$ $clc2 = f_2(data2, state2, param2, \ldots)$ $clc3 = f_3(data1, data2, state1, state2, param1, param2, \ldots)$ It will be understood that each processing operation may include multiple instructions and that the number and type of parameters may vary according to the operation performed. For example, the number and type of parameters may be related to a specific processing algorithm. Also, processing operations may be performed sequentially or concurrently. In each case, results from the processing operations are available to control block 124 to complete processing of the packets during the processing cycle.

In one embodiment, the processing operations include a first operation based on the first packet information 104-1, a second operation based on the second packet information 104-2, and a third operation based upon the first packet information 104-1 and second packet information 104-2. After these operations have been performed, control block 124 selects results from the processing operations and may use the selected results to update state data elements 112. In various embodiments, control block 124 selects among the results based upon whether a predetermined relationship is detected between packets 104.

In a specific embodiment, control block 124 compares index values to determine whether the predetermined relationship exists between packets 104. If ndx1 and ndx2 have different values, control block 124 may detect that the packets do not have the predetermined relationship and may treat the data packets as unrelated. For example, first state data element 112-1 may be updated with first result (clc1) and second state data element 112-2 may be updated with second result (clc2). If ndx1 matches ndx2, control block 124 may detect the predetermined relationship and the packets may be processed as a group. In this case, state data elements 112 may each be updated with the third result (clc3) based upon packet information and control information for both packets.

After control block 124 has selected among the results and has updated the state values, each state data element 112 is written to state memory 108. Thus, control block 124 may write the updated state data elements 112-1, 112-2 to first state memory 108-1 and also write the updated state data elements 112-1, 112-2 to second state memory 108-2. In this way, packets received from multiple processing pipelines can be processed according to a common characteristic with packet-level granularity.

Figure 2:
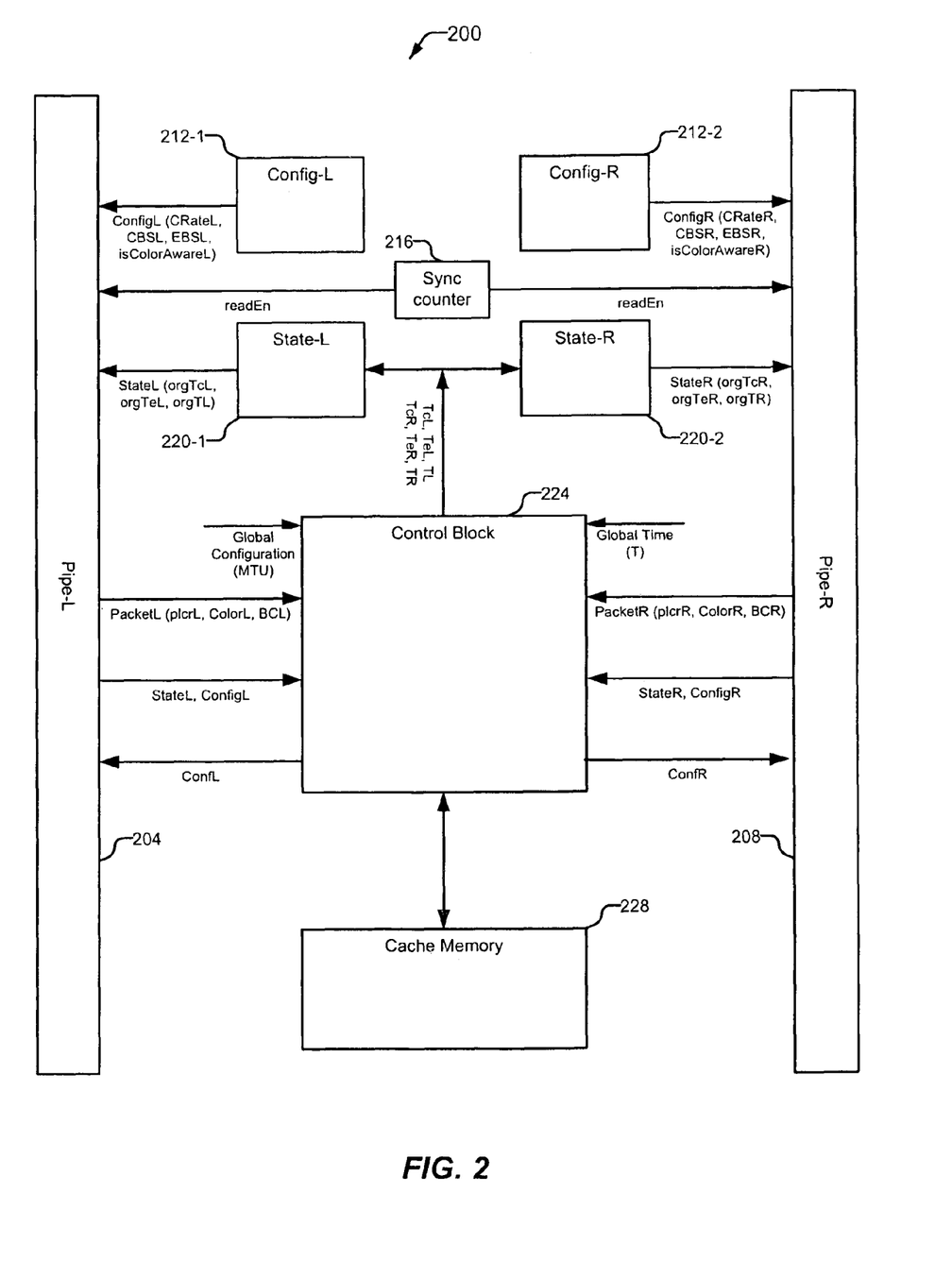
FIG. 2 is a high-level block diagram of a network device adapted to perform rate limiting operations according to an embodiment of the present invention.

FIG. 2 is a high-level block diagram of a network device 200 according to another embodiment of the present invention. In this embodiment, network device 200 is adapted to perform rate limiting operations for two packets received from separate ingress pipelines during each processing cycle. For example, as discussed below, network device 200 may be configured to perform single-rate three color (srTCM) ingress policing for the packets. Alternatively, as will be recognized by persons of ordinary skill in the art, single-rate two color policing may be implemented with only minor changes to the embodiment described below.

As shown, control block 224 receives information about a first packet from ingress processing pipeline 204 (hereinafter "left-side ingress pipe"). First packet information (PacketL) may include, for example, a rate limit identifier (plcrL), a color value (ColorL), and a packet size (BCL). Rate limit identifier plcrL may be used by control block 224 to retrieve control information for processing the packet and also to determine whether the packet is subject to the same rate limit as other packets received during the processing cycle. Color value ColorL may indicate a conformance level of the packet and, in some embodiments, is set by a marking engine or other processing stage of network device 200. Packet size BCL may represent a size of the packet or a corresponding number of rate limiting tokens.

Control block 224 may also receive information about a second packet in the processing cycle. As shown, control block 224 receives second packet information PacketR from ingress processing pipeline 208 (hereinafter "right-side ingress pipe"). Second packet information PacketR generally includes the same elements as first packet information PacketL and may be used in the same manner by control block 224 to process the second packet. For example, PacketR may include a rate limit identifier plcrR, a color value ColorR, and a packet size BCR. It will be noted that PacketL and PacketR may correspond to packets received from a same network source or from a different network source and may be subject to the same rate limit or to different rate limits. Consequently, rate limit identifiers plcrL, plcrR may or may not have the same values.

In some embodiments, control block 224 synchronizes packets received from right and left ingress pipes 204, 208 to a clock edge before the packets are processed. This can be accomplished in a variety of ways. For example, as shown, a counter 216 may be configured to toggle a read enable signal (readEn) that controls when control block 224 will receive packets from each ingress pipe. In this way, control block 224 may receive data packets from both ingress pipes during a same clock cycle and at either a rising edge or a falling edge of the clock.

When a packet is received, control block 224 may use the rate limit identifier of the packet to retrieve control information from memory. In some embodiments, separate memory elements store control information for processing packets received from each ingress pipe. Thus, as shown, a left-side configuration memory 212-1 and a left-side state memory 220-1 supply configuration and state data respectively for processing the first packet. Similarly, a right-side configuration memory 212-2 and a right-side state memory 220-2 correspond to right-side ingress pipe 208 and store control information for processing the second packet.

Configuration data may include parameters used in token-bucket rate limiting algorithms. In specific embodiments, these parameters may be used to implement srTCM rate limit algorithms. As shown, configuration data (ConfigL, ConfigR) includes a fill rate, a committed burst-size, an excess burst-size, and a color mode indicator. Fill rate parameters (CRateL, CRateR) may control the rate at which tokens accrue to a particular rate limiting bucket and may correspond to a committed information rate such as that specified in a service-level agreement. Burst-size parameters, on the other hand, may establish an upper limit to the number of tokens that can accumulate in a bucket. For example, committed burst-size parameters (CBSL, CBSR) may operate to ensure a guaranteed level of network service. Excess burst-size parameters (EBSL, EBSR), on the other hand, provide an additional conformance level. In some embodiments, excess burst-size may correspond to best efforts network service.

Configuration data may also include a color mode indicator. Color mode indicators enable mode selection on a per rate-limiter basis. For example, color mode indicators (isColorAwareL, isColorAwareR) may be used to indicate either color-aware processing or color-blind processing for a particular rate limit identifier. Color-aware processing may indicate that a packet has been pre-colored and that it should therefore be processed according to its color value. Color-blind processing, on the other hand, may indicate that all packets are initially assumed to be conforming packets regardless of their color values.

In some embodiments, state data includes additional rate limiting parameters. As shown, state data includes a committed bucket value orgTcL, orgTcR and an excess bucket value orgTeL, orgTeR. The committed and excess bucket values may represent tokens available to a packet with a particular rate limit identifier at the start of a processing cycle. Timestamps TL, TR may also be included as part of state data (StateL, StateR) and may represent a system time (T) at which a bucket was last updated.

Network device 200 may also include a cache memory 228 for storing recently accessed state data. Control block 224 may be configured to check cache memory 228 for state data associated with a packet before accessing state memory 220. If state data is found, it may be retrieved from cache memory 228 without accessing state memory. In other embodiments, state data elements may be concurrently retrieved from both cache memory 228 and state memory 220. In this case, control block 224 may be further configured to use the most up-to-date values from among the available state data.

State data may be organized or indexed in cache memory 228 by rate limit identifier. Thus, for each packet received during the processing cycle, control block 224 may check the content of cache memory 228 for a state data element corresponding to the rate limit identifier of the received data packet. Cache memory depth may be based upon a latency associated with the ingress pipes. For example, in some embodiments, cache memory stores a number of packets equal to twice the ingress pipe latency.

Control block 224 performs several processing operations using control information retrieved from memory. These processing operations may be performed sequentially or concurrently and may represent different rate limiting possibilities. For example, in a first possibility, the packets may be detected as having different rate limit identifiers. This may occur, for example, when the packets are associated with different flows and each flow must be policed separately. Accordingly, the processing operations may include separate token-bucket calculations for each of the different rate limit identifiers. In another possibility, the packets may be detected as having the same rate limit identifier. In this case, a combined packet size may be used for rate limit processing. The processing operations may thus include token-bucket calculations based upon a sum of the packet sizes.

In various embodiments, control block 224 selects among the results of the processing operations and updates each state data element. In some specific embodiments, control block 224 updates state data elements StateL, StateR according to whether a predetermined relationship among the packets has been detected. For example, if the packets are detected as having the same rate limit identifier, control block 224 may select results from the processing operations that correspond to a combined packet size. Alternatively, if the packets are not detected as having the same rate limit identifier, control block 224 may select results from the processing operations corresponding to separate token-bucket calculations. At the completion of each processing cycle, control block 224 writes the updated state data StateL, StateR to each state memory element. State memories 220 may then be synchronized with the same data after each processing cycle is completed.

Control block 224 may also determine a conformance level for each packet that is processed. In some embodiments, the conformance level may be based upon the number of tokens that have accumulated in the committed and excess buckets corresponding to the packet's rate limit identifier. The conformance level of a packet may be based upon color value as described in the exemplary code that follows.

Figure 3:
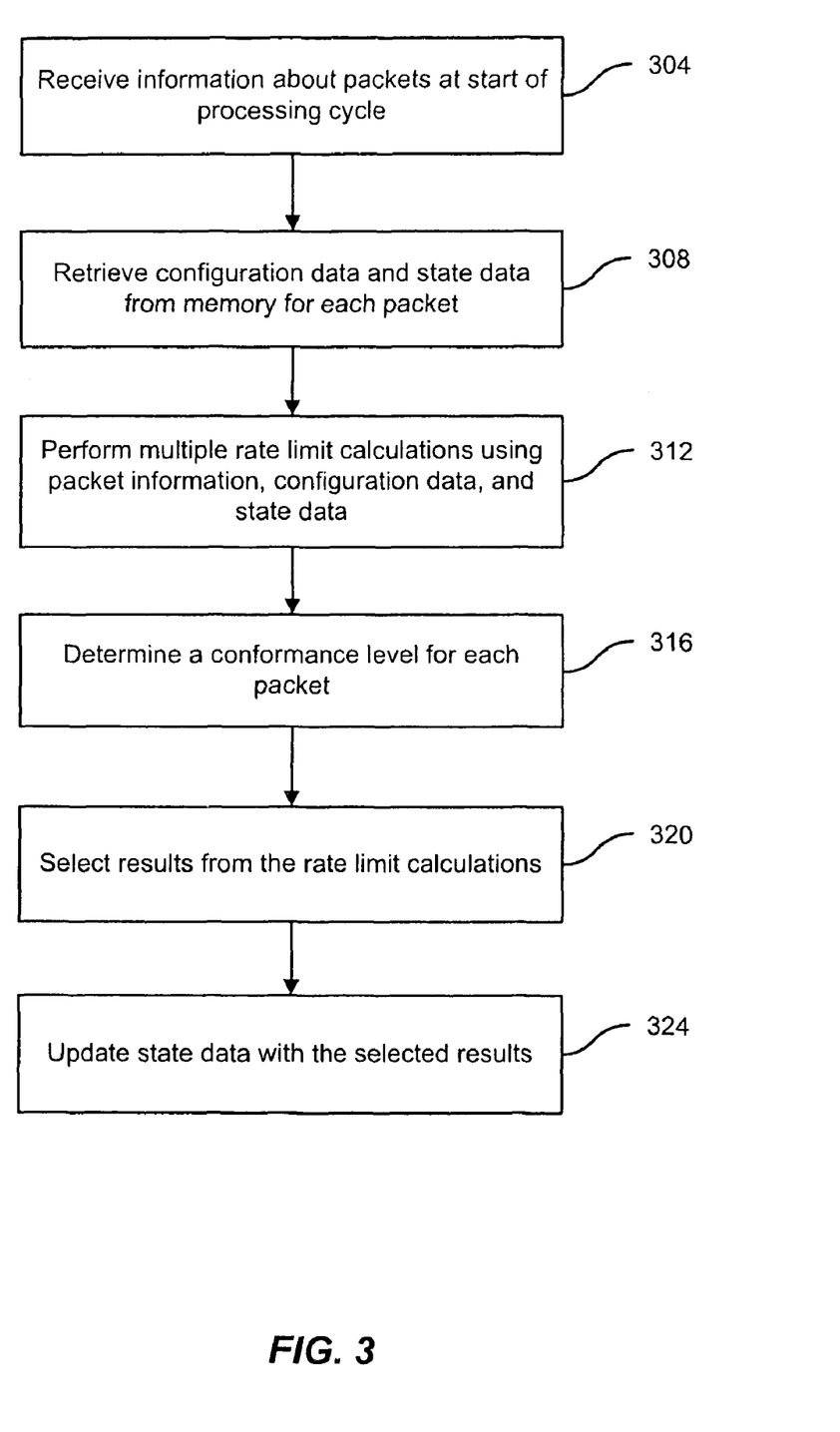
FIG. 3 is a flowchart of processing operations performed by a network device according to an embodiment to the present invention.

FIG. 3 is a flowchart of processing steps performed by a network device according to an embodiment of the present invention. The steps enable rate limit processing of packets received from multiple ingress pipelines and may, for example, be performed by a control block similar to control block 224. In the following discussion, specific reference may be made to the embodiment of FIG. 2 to clarify the concepts presented. However, it will be recognized that these processing steps may be used with multiple embodiments of the network device.

In a first step 304, information about packets to be processed during the processing cycle is received. Packet information may be received from separate ingress pipelines as discussed in connection with FIG. 2. At step 308, configuration and state data is retrieved from memory for each packet. Configuration data, for example, may correspond to device settings such as a committed information rate applicable to packets received from a particular network source. State data, on the other hand, may track the current state of packets from the network source. In some embodiments, configuration and state data are stored in separate memories and are retrieved using rate limit identifiers associated with the packets.

At step 312, multiple rate limit calculations are performed using the packet information, configuration data, and state data. For example, during a processing cycle, packets from multiple sources may be received from separate ingress pipelines for processing. Some packets of the packets may be subject to a common rate limit, whereas other packets may have different rate limits. Rate limit calculations may represent the various possibilities in this distributed context and may be performed concurrently. The number and type of calculations may depend upon the number of packets processed during the processing cycle and the particular rate limit algorithm used. In some specific embodiments, the rate limit calculations include bucket values such as the committed and excess buckets described in connection with FIG. 2.

A conformance level for each packet is determined at step 316. In some embodiments, the conformance level may affect how the packet will be processed by subsequent processing stages of the network device. For example, GREEN, YELLOW, and RED conformance levels may be used to indicate whether the packet is conforming, partly conforming, or non-conforming respectively. Conformance may be based upon a service level agreement or other criteria.

At step 320, results of the rate limit calculations are selected. The selected results are then used at step 324 to update state data in memory. In various embodiments, the network device detects whether a predetermined relationship exists between one or more of the received packets and selects results for updating the state data based upon whether the relationship has been detected. For example, the network device may detect whether the packets have a same rate limit identifier or whether they have different rate limit identifiers.

Referring now to FIGS. 2-3, exemplary code for performing rate limit processing is now provided. Single-rate three color ingress policing is provided for two packets received during a processing cycle. The exemplary code includes fair-packet length requirements based upon configurable maximum transmission unit (MTU). Although code for processing two packets is provided, persons of skill in the art will recognize that this approach may be extended to process more than two packets per processing cycle.

```
//Compute values for TcL, TeL, TcR and TeR
TcL<=min(CBSL, orgTcL+(T-orgTL)*CRateL);
TeL<=min(EBSL, orgTeL+(T-orgTL)*CRateL);
confTcL<=TcL-BCL;
confTeL<=TeL-BCL;
TcR<=min(CBSR, orgTcR+(T-orgTR)*CRateR);
TeR<=min(EBSR, orgTeR+(T-orgTR-T)*CRateR);
confTcR<=TcR-BCR;
confTeR<=TeR-BCR;
confTc<=confTcL-BCR;
confTe<=confTeL-BCR;
//Compute conformance levels for packetL and packetR
ColorL<=is ColorAwareL ? ColorL:GREEN;
ColorR<=is ColorAwareR ? ColorR:GREEN;
ConfL<=(ColorL==GREEN)&&(TcL>=2*MTU)      ?  GREEN:
    (ColorL!=RED)&&(TeL>=2*MTU)?YELLOW:RED;
ConfR<=(ColorR==GREEN)&&(TcR>=2*MTU)      ?  GREEN:
    (ColorR!=RED)&&(TeR>=2*MTU)  ?  YELLOW: RED;
//Select values of TcL, TeL, TcR and TeR
Tc<=(ConfL==GREEN)&&(ConfR==GREEN) ? confTc:
```

```
(ConfL!=GREEN)&&(ConfR==GREEN) ? confTcR:
(ConfL==GREEN)&&(ConfR!=GREEN) ? confTcL:
    TcL
Te<=(ConfL==YELLOW)&&(ConfR==YELLOW) ?
    confTe:
    (ConfL!=YELLOW)&&(ConfR==YELLOW) ?con-
      fTeR:
    (ConfL==YELLOW)&&(ConfR!=YELLOW) ? conf-
      TeL:TeL
//Test whether packets have the same rate limit identifier
//and update the bucket values accordingly
TcL<=(ptrL==ptrR) ? Tc:
    (ConfL==GREEN) ? confTcL TcL;
TeL<=(ptrL==ptrR) ? Te:
    (ConfL==YELLOW) ? confTeL:TeL;
TL<=T;
TcR<=(ptrL==ptrR) ? Tc:
    (ConfR==GREEN) ? confTcR:TcR;
TeR<=(ptrL==ptrR) ? Te:
    (ConfR==YELLOW) ? confTeR:TeR;
TR<=T;
```

Figure 4:
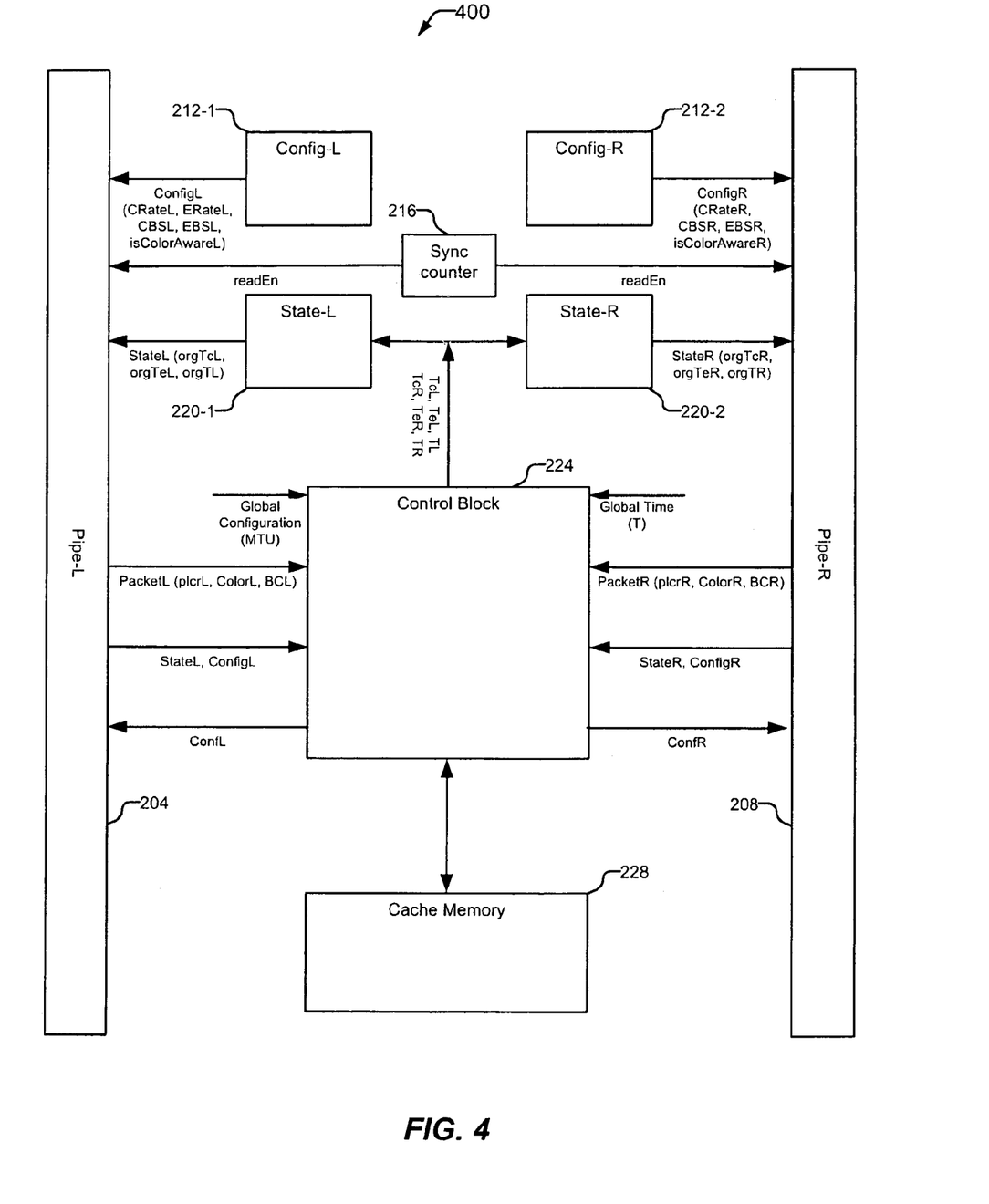
FIG. 4 is a high-level block diagram of a network device according to an embodiment of the present invention.

FIG. 4 is a high-level block diagram of a network device 400 adapted to perform two-rate three color (trTCM) rate limit processing of packets according to the present invention. In this embodiment, rate limit processing of two packets per processing cycle is performed. In this embodiment, configuration memory 212 stores a peak information rate (ERateL, ERateR) as well as the committed information rate (CRateL, CRateR) for each rate limit identifier.

With reference to FIG. 4, exemplary code for performing trTCM rate limit processing of two packets per processing cycle is now provided.

```
//Compute possible values of TcL, TeL, TcR and TeR
TcL<=min(CBSL, orgTcL+(T-orgTL)*CRateL);
TeL<=min(EBSL, orgTeL+(T-orgTL)*ERateL);
confTcL<=TcL-BCL;
confTeL<=TeL-BCL;
TcR<=min(CBSR, orgTcR+(T-orgTR)*CRateR);
TeR <=min(EBSR, orgTeR+(T-orgTR)*ERateR);
confTcR<=TcR-BCR;
confTeR<=TeR-BCR;
confTc<=confTcL-BCR;
confTe<=confTeL-BCR;
//Compute the conformance levels of packetL and packetR
ColorL<=is ColorAwareL ? ColorL:GREEN;
ColorR<=is ColorAwareR ? ColorR:GREEN;
ConfL<=(ColorL==RED)||(TeL<2*MTU)'? RED:
    (ColorL==YELLOW)||(TcL<2*MTU) ? YELLOW:
      GREEN;
ConfR<=(ColorR==RED)||(TeR<2*MTU) ? RED:
    (ColorR==YELLOW)||(TcR<2*MTU) ? YELLOW:
      GREEN;
//Select the values of TcL, TeL, TcR and TeR
Tc<=(ConfL==GREEN)&&(ConfR==GREEN) ? con-
    fTc:
    (ConfL!=GREEN)&&(ConfR==GREEN) ? confTcR:
    (ConfL==GREEN)&&(ConfR!=GREEN) ? confTcL:
      TcL
Te<=(ConfL==RED)&&(ConfR==RED) ? confTe:
    (ConfL!=RED)&&(ConfR!=RED) ? confTeR:
    (ConfL==RED)&&(ConfR==GREEN) ? confTeL:TeL
//Test whether packets have the same rate limit identifier
//and update the bucket values accordingly
TcL<=(ptrL==ptrR) ? Tc:
    (ConfL==GREEN) ? confTcL:TcL;
TeL<=(ptrL==ptrR) ? Te:
    (ConfL!=RED) ? confTeL:TeL;
TL<=T;
TcR <=(ptrL==ptrR) ? Tc:
    (ConfR==GREEN) ? confTcR:TcR;
TeR <=(ptrL==ptrR) ? Te:
    (ConfR!=RED) ? confTeR:TeR;
TR<=T;
```

Figure 5A:
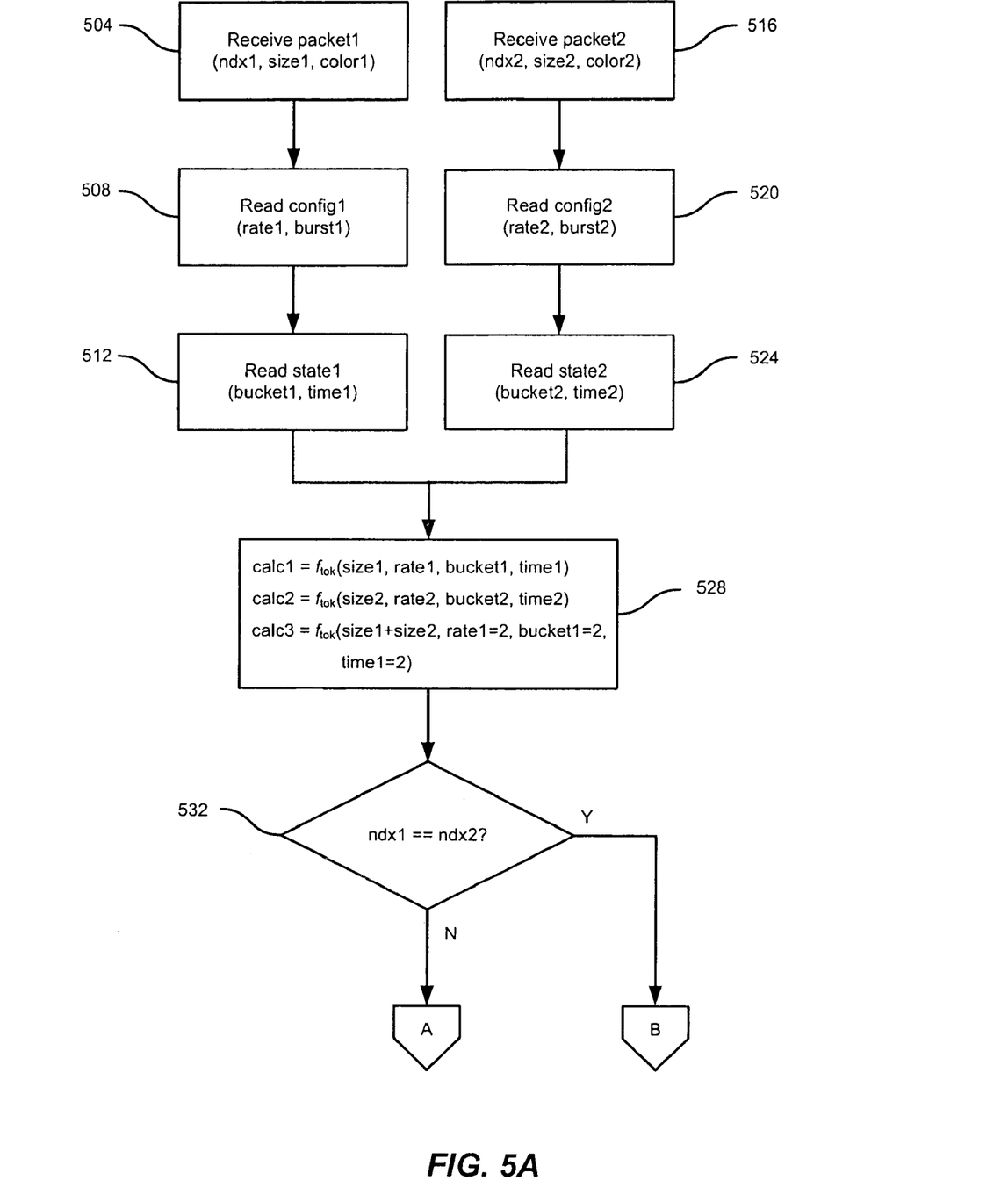
FIGS. 5A and 5B are a flow chart showing processing operations performed by a network device according to an embodiment of the present invention.
Figure 5B:
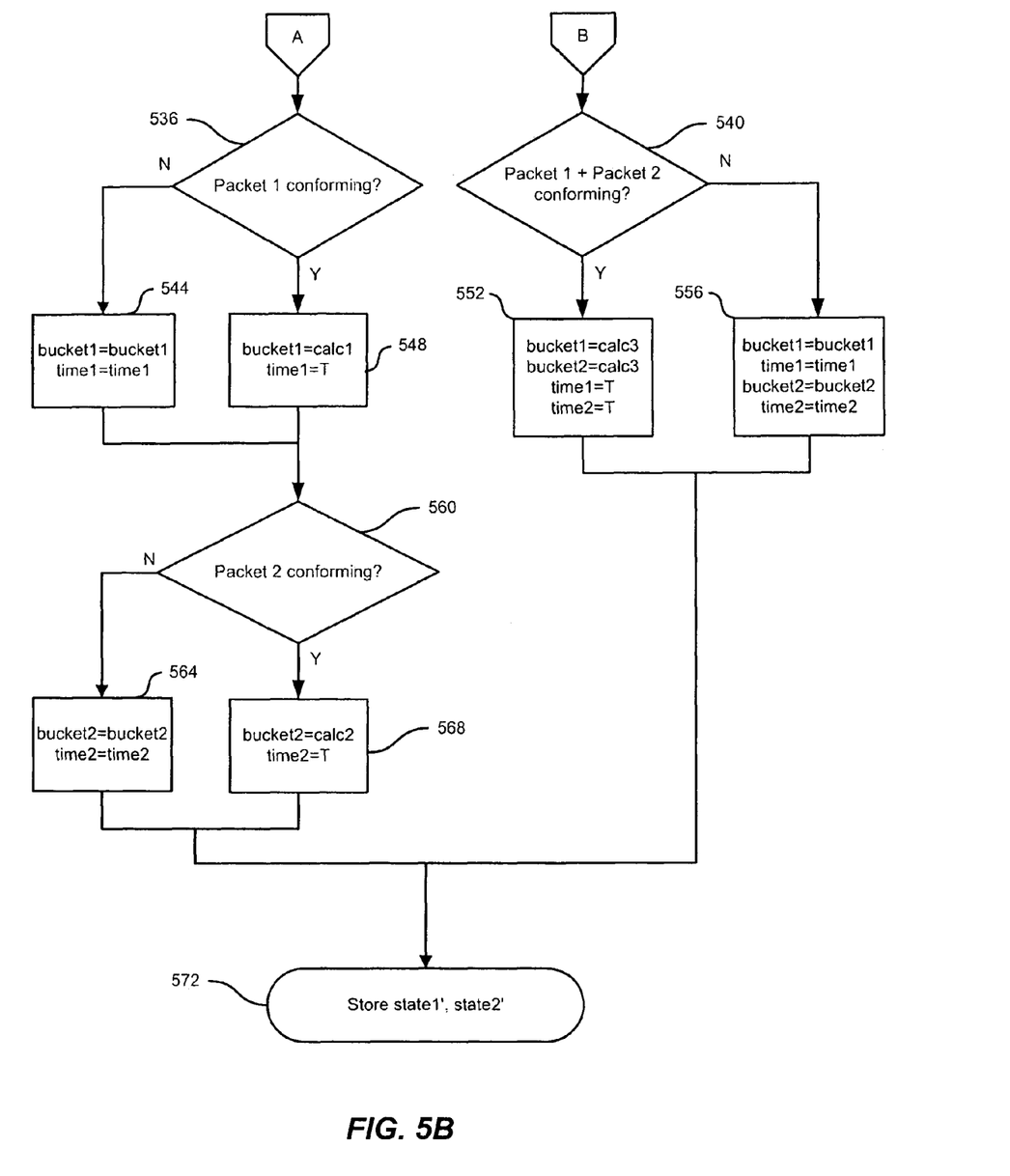

FIGS. 5A and 5B are a flow-chart of various steps performed by a network device according to an embodiment of the present invention. The process begins when information about packets is received. Each packet may be received from a separate ingress pipe and each ingress pipe may accept packets from multiple network devices. If only one data packet is received, a dummy packet may be substituted for the missing packet. For example, a packet with length zero and a randomly selected index value may be used in place of the missing packet.

In a first step 504, information about a first data packet is received. First data packet information may include, for example, a first index, a first packet size, and a first color value. The first index may be used to retrieve a first configuration data element 508 and a first state data element 512 from memory. Although shown in sequence, the first configuration data element and the first state data element may be retrieved concurrently from separate memory elements. Thus, in some embodiments, the first configuration data element is retrieved from a first copy of configuration data stored in a first configuration memory and the first state data element is retrieved from a first copy of state data stored in a first state memory. Configuration data may include, at least, a first fill rate parameter and first burst-size parameter. State data may include a first bucket-size and a first time stamp value.

Second data packet information may be received 516 and synchronized to a same edge of a same clock cycle as the first data packet information. An index value of the second data packet information may be used to retrieve configuration data 520 and state data 524 from a second configuration memory and a second state memory respectively. Although shown in sequence, configuration data and state data may be retrieved concurrently.

In a next step 528, several processing operations are performed. These processing operations may represent rate limiting functions associated with the packets. In an exemplary embodiment, the rate limiting functions may implement a token-bucket algorithm. For example, a first processing operation, calc1, may adjust the first bucket-size by adding tokens based upon elapsed time and the first fill rate and removing tokens based upon the first packet size. Similarly, a second processing operation, calc2, may adjust the second bucket-size by adding tokens based upon elapsed time and the second fill rate and removing tokens based upon the second packet size.

A third processing operation, calc3, may also be performed using the first packet size and the second packet size. This operation may represent a situation where both packets are part of a same flow and are therefore subject to the same rate limit. In this case, the first bucket-size may be adjusted by adding tokens based upon elapsed time and the first fill rate and by removing tokens based upon a combined packet size including both the first packet size and the second packet size. Alternatively, the second bucket-size may be adjusted by adding tokens based upon elapsed time and the second fill rate and by removing tokens based upon the combined packet size.

Results of one or more processing operations are selected and used to update the first and second state data elements. For example, the first index value may be compared to the second index value 532. If the values are equal, the packets may be subject to the same rate limit. In this case, a next check 540 is made to determine whether the combined packets are conforming. If the result of the third processing operation (Clc3) is greater than or equal to zero, this may indicate that sufficient tokens are available for the combined packets and the packets may be treated as conforming. The first bucket-size may be updated with the result of the third processing operation (clc3) and the first time value may be updated with a current system time 552. In addition, the second bucket-size may be updated with the result of the third processing operation (clc3) and second time value may be updated with, a current system time 552.

If, however, the result of the third processing operation clc3 is less than zero, this may indicate that insufficient tokens are available for the combined packets. Thus, both packets may be treated as non-conforming. In this situation, the first and second state values may not be changed 556. In some embodiments, tokens are added to the first and second buckets (bucket 1, bucket2) respectively based upon the time elapsed since each was last updated regardless of whether the packets are treated as conforming or non-conforming.

If the first index does not equal the second index, the packets may be processed separately and each packet may be individually checked for conformance 536, 560. Thus, if the result of the first processing operation (clc1) is greater than or equal to zero, the first data packet may be treated as conforming. The first bucket-size may be updated with the result of the first calculation (clc1) and the first time value may be updated with the current system time 548. If the result of the first processing operation (clc1) is less than zero, the first data packet may be treated as non-conforming and the first state data element may not be changed 544.

This process may be repeated for the second data packet using the result of the second processing operation. If the result of the second processing operation is greater than or equal to zero 560, the second packet may be treated as conforming. The second bucket-size may be updated with the result of the second processing operation (clc2) and the second time value may be updated with the current system time 568. Alternatively, if the result of the second processing operation (clc2) is less than zero 560, the second data packet may be treated as non-conforming and the second data element may not be changed 564.

After processing has been completed, the state data elements are stored for the next processing cycle 572. This may involve writing updated or unmodified state data elements to each copy of the state data. At the end of the processing cycle, each copy of the state data may contain up-to-date information about packet processing operations.

The above embodiments of the present invention are illustrative and not limiting. Various alternatives and equivalents are possible. The invention is not limited to a particular number of ingress pipes and is not limited by the number or type of attributes carried by the packets. The invention is not limited by the size of the memory table nor is it limited by the type of integrated circuit in which the present invention may be disposed. Moreover, the present disclosure is not limited to any specific type of process technology, e.g., CMOS, Bipolar, or BICMOS that may be used to manufacture the present invention. Other additions, subtractions or modifications are obvious in view of the present disclosure and are intended to fall within the scope of the appended claims.

In some embodiments, the control block may be implemented using dedicated hardware such as an application specific integrated circuit (ASIC). In yet other embodiments, the control block may include a combination of software and hardware elements. As an example, a control block may include one or more application specific integrated circuits, programmable logic devices, gate arrays, microprocessors, digital signal processors, dedicated electronics, or various combinations thereof. Control block also includes all code, data, and instructions necessary to carry out a particular function. In yet other embodiments, the control block may be implemented using a general purpose processor.

While the principles of the disclosure have been described above in connection with specific apparatuses and methods, it is, to be clearly understood that this description is made only by way of example and not as a limitation on the scope of the invention.

What is claimed is:

1. A method of processing packets, comprising:
receiving, by a network device, first and second packets, the first and second packets having first and second index values respectively;
looking up, by the network device, first and second entries using said first and second index values;
performing, by the network device, first and second operations using said first and second entries; and
updating, by the network device, said first and second entries identically if a predetermined relationship is detected between said first and second index values, otherwise updating said first and second entries separately.

2. The method of claim 1 wherein said first and second packets are received from first and second ingress pipelines respectively, and further comprising synchronizing, by the network device, said packets to a same clock cycle before processing begins.

3. The method of claim 1 wherein said first and second entries contain rate limit parameters, and wherein said predetermined relationship is detected if said first and second packets are subject to a same rate limit.

4. The method of claim 1 wherein said first operation comprises updating a separate number of tokens corresponding to a rate limit for each of said first and second entries, and said second operation comprises updating a combined number of tokens for said first and second entries.

5. The method of claim 1 wherein said first packet comprises a first attribute and said second packet comprises a second attribute, the method further comprising:
maintaining, by the network device, a first table of control information having N entries, each entry associated with a different one of N index values;
maintaining, by the network device, a second table of control information having N entries, each entry associated with a different one of the N index values;
retrieving, by the network device, said first entry from said first table, said first entry corresponding to the first index value;
retrieving, by the network device, said second entry from said second table, said second entry corresponding to the second index value;
performing, by the network device, said first operation using said first entry and said first attribute to generate a first result;
performing, by the network device, said second operation using said second entry and said second attribute to generate a second result;
performing, by the network device, a third operation using said first and second entries and said first and second attributes to generate a third result; and
updating, by the network device, the first and second entries according to a value defined by the third result if the predetermined relationship is detected between said first and second index values.

6. The method of claim 5 further comprising:
updating, by the network device, the first entry according to a value defined by the first result if the predetermined relationship is not detected between said first and second index values;
updating, by the network device, the second entry according to a value defined by the second result if the predetermined relationship is not detected;
updating, by the network device, an entry in the first table corresponding to the second index value according to the value defined by the second result if the predetermined relationship is not detected; and
updating, by the network device, an entry in the second table corresponding to the first index value according to the value defined by the first result if the predetermined relationship is not detected.

7. The method of claim 6 wherein the predetermined relationship is detected if the first index value equals the second index value.

8. The method of claim 7 wherein the first attribute includes a first packet size and a first color value and the second attribute includes a second packet size and a second color value.

9. The method of claim 8 wherein said first entry includes a first fill rate, a first bucket value, a first burst-size and a first time stamp and said second entry includes a second fill rate, a second bucket value, a second burst-size and a second time stamp.

10. The method of claim 9 further comprising:
adjusting, by the network device, the first bucket value by a first number of tokens if the predetermined relationship is not detected;
adjusting, by the network device, the second bucket value by a second number of tokens if the predetermined relationship is not detected;
adjusting, by the network device, the first and second bucket values by a third number of tokens if the predetermined relationship is detected; and
adjusting, by the network device, the first time stamp and the second time stamp based upon a time reference.

11. The method of claim 5 wherein each entry includes two fill rates, two corresponding buckets values and a single time stamp.

12. The method of claim 5 wherein said first packet and said second packet are synchronized to a same clock cycle before processing begins.

13. A device configured to process packets, comprising:
first and second ingress pipelines configured to receive first and second packets having first and second index values respectively;
first and second memories comprising first and second tables;
a control block configured to look up first and second entries in said first and second tables using said first and second index values, perform first and second operations using said first and second entries from said tables, and update both tables identically if a predetermined relationship is detected between said first and second index values, otherwise update said tables separately.

14. The device of claim 13 wherein said first and second packets are synchronized to a same clock cycle before processing begins.

15. The device of claim 13 wherein said entries contain rate limit parameters, and wherein said predetermined relationship is detected if said first and second packets are subject to a same rate limit.

16. The device of claim 13 wherein said first operation comprises calculating a separate number of tokens corresponding to a rate limit for each of said first and second entries, and said second operation comprises calculating a combined number of tokens for said first and second entries.

17. The device of claim 13 wherein:
said first packet includes a first attribute;
said second packet includes a second attribute;
said first table has N entries, each entry corresponding to a different one of N index values;
said second table has N entries, each entry corresponding to a different one of the N index values; nd
said control block is configured to perform said first operation using said first attribute and said first entry to generate a first result, said second operation using said second attribute and said second entry to generate a second result, and a third operation using said first and second attributes and said first and second entries to generate a third result, said control block further configured to update said first and second entries according to a value defined by the third result if a predetermined relationship between the first index value and the second index value is detected.

18. The device of claim 17 wherein said control block is further configured to update the first entry according to a value defined by the first result if the predetermined relationship is not detected, to update the second entry according to a value defined by the second result if the predetermined relationship is not detected, to update an entry in the first table corresponding to the second index value according to the value defined by the second result if the predetermined relationship is not detected, and to update an entry in the second table corresponding to the first index value according to the value defined by the first result if the predetermined relationship is not detected.

19. The device of claim 18 wherein the predetermined relationship is detected if the first index value equals the second index value.

20. The device of claim 19 wherein said first packet attribute includes a first packet size and a first color value and said second packet attribute includes a second packet size and a second color value.

21. The device of claim 20, wherein said first entry includes a first fill rate, a first bucket value, a first burst-size and a first time stamp and said second entry includes a second fill rate, a second bucket value, a second burst-size and a second time stamp.

22. The device of claim 21, wherein said control block is further configured to adjust the first bucket value by a first number of tokens and the second bucket value by a second number of tokens if the predetermined relationship is not detected, to adjust said first and second bucket values by a third number of tokens if the predetermined relationship is detected, and to adjust said first time stamp and said second time stamp according to a time reference.

23. The device of claim 17, wherein each entry includes two fill rates, two corresponding bucket values and a single time stamp.

24. The device of claim 17 wherein said first packet and said second packets are received by said control block from said first and second ingress pipelines and wherein said control block synchronizes the packets to a same clock cycle before processing begins.

25. A device for processing packets, comprising:
- means for receiving first and second packets, the first and second packets having first and second index values respectively;
- means for looking up first and second entries using said first and second index values;
- means for performing first and second operations using said first and second entries;
- means for determining a relationship between said first and second index values; and
- means for updating both said first and second entries identically if a predetermined relationship is detected between said first and second index values, otherwise updating said first and second entries separately.

26. The device of claim 25 further comprising means for synchronizing said packets to a same clock cycle before processing begins.

27. The device of claim 25 wherein said entries contain rate limit parameters, and wherein said predetermined relationship is detected if said first and second packets are subject to a same rate limit.

28. The device of claim 25 wherein said first operation comprises updating a separate number of tokens corresponding to a rate limit for each of said first and second entries, and said second operation comprises updating a combined number of tokens for said first and second entries.

29. The device of claim 25 wherein said first packet comprises a first attribute and said second packet comprises a second attribute, the device further comprising:
- means for maintaining a first table of control information having N entries, each entry associated with a different one of N index values;
- means for maintaining a second table of control information having N entries, each entry associated with a different one of the N index values;
- means for retrieving said first entry from the first table, said first entry corresponding to the first index value;
- means for retrieving said second entry from the second table, said second entry corresponding to the second index value;
- means for performing a first operation using said first entry and said first attribute to generate a first result; and
- means for performing a second operation using said second entry and said second attribute to generate a second result;
- means for performing a third operation using said first and second entries and said first and second attributes to generate a third result;
- means for updating the first and second entries according to a value defined by the third result if a predetermined relationship is detected between said first and second index values.

30. The device for processing packets recited in claim 29 further comprising:
- means for updating the first entry according to a value defined by the first result if the predetermined relationship is not detected between said first and second index values;
- means for updating the second entry according to a value defined by the second result if the predetermined relationship is not detected;
- means for updating an entry in the first table corresponding to the second index value according to the value defined by the second result if the predetermined relationship is not detected; and
- means for updating an entry in the second table corresponding to the first index value according to the value defined by the first result if the predetermined relationship is not detected.

31. The device for processing packets recited in claim 30 wherein the predetermined relationship is detected if the first index value equals the second index value.

32. The device for processing packets recited in claim 31 wherein the first attribute includes a first packet size and a first color value and the second attribute includes a second packet size and a second color value.

33. The device for processing packets recited in claim 32 wherein said first entry includes a first fill rate, a first bucket value, a first burst-size and a first time stamp and said second entry includes a second fill rate, a second bucket value, a second burst-size and a second time stamp.

34. The device for processing packets recited in claim 33 further comprising:
- means for adjusting the first bucket value by the first number of tokens if the predetermined relationship is not detected;
- means for adjusting the second bucket value by the second number of tokens if the predetermined relationship is not detected;
- means for adjusting the first and second bucket values by the third number of tokens if the predetermined relationship is detected; and
- means for adjusting the first time stamp and the second time stamp based upon a time reference.

35. The device for processing packets recited in claim 29 wherein each entry includes two fill rates, two corresponding bucket values and a single time stamp 35.

36. The device for processing packets recited in claim 29 wherein said first packet and said second packet are synchronized to a same edge of a same clock cycle before processing begins.

* * * * *